(No Model.)
A. MILLER.
MACHINE FOR REMOVING TIRES FROM VEHICLE WHEELS.
No. 598,736. Patented Feb. 8, 1898.
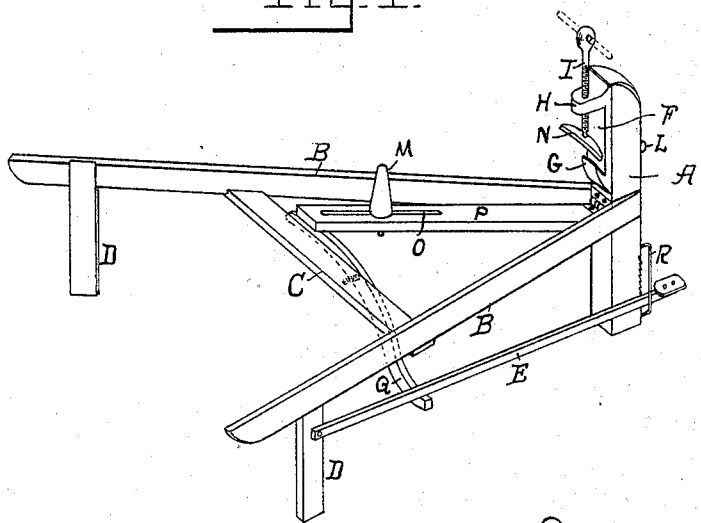
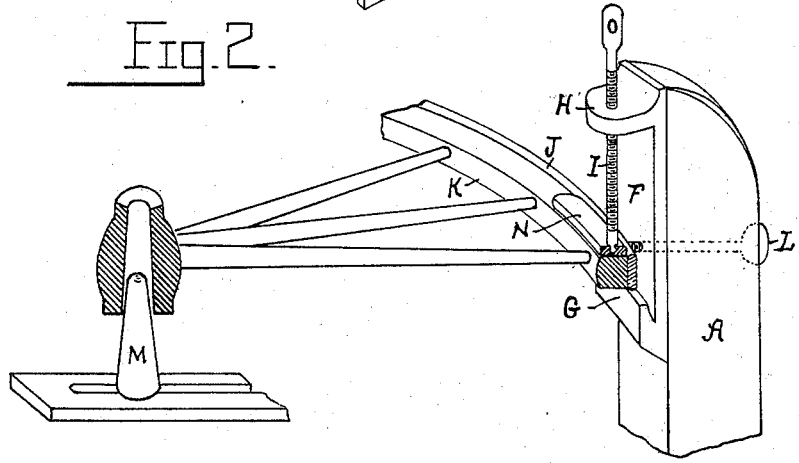
WITNESSES:
Harry Pagle.
Maggie Oltsch.
August Miller
INVENTOR
BY George Oltsch
ATTORNEY.

UNITED STATES PATENT OFFICE.

AUGUST MILLER, OF NILES, MICHIGAN.

MACHINE FOR REMOVING TIRES FROM VEHICLE-WHEELS.

SPECIFICATION forming part of Letters Patent No. 598,736, dated February 8, 1898.

Application filed April 26, 1897. Serial No. 634,062. (No model.)

*To all whom it may concern:*

Be it known that I, AUGUST MILLER, a citizen of the United States, residing at Niles, in the county of Berrien and State of Michigan, have invented certain new and useful Improvements in Machines for Removing Tires from Vehicle-Wheels; and I do hereby declare the following to be a full, clear, and exact description of the invention, such as will enable others skilled in the art to which it appertains to make and use the same.

My invention relates to an improvement in machines for removing tires from vehicle-wheels; and it consists in a vertically and laterally adjustable cone or support upon which the wheels are placed, a bearing upon which the tire rests, and a screw which passes through the post to which the bearing is secured, combined with a vertically-moving screw having a bearing-plate loosely attached to its lower end and which forces the felly of the wheel from the tire, all of which will be more fully described hereinafter.

The objects of my invention are to provide a machine by means of which the tires can be quickly forced from the vehicle-wheels, and in which a cone for the support of the wheels is made both vertically and laterally adjustable, so as to adapt the machine to wheels of different diameters and hubs of different lengths, and in which the parts are few, simple, and will not get out of order.

In the accompanying drawings, Figure 1 is a perspective of a machine which embodies my invention complete. Fig. 2 is an enlarged perspective showing the wheel in position to be operated upon.

The supporting-frame for the wheel while being acted upon consists of the post A, the two sides B, which are rigidly secured thereto at one end and extend therefrom at an angle to each other and which frames are connected by the cross-piece C. These sides are supported at their outer ends by the legs D, to one of which the operating-lever E is pivoted.

The post A rises at a suitable distance above the tops of the two frames B, and has secured to it the casting F, which has formed upon its lower end the support G for the tire, and at its upper end the bearing H, through which the vertically-moving screw I passes. The support G is located in between the inner ends of the two sides B and serves to support the tire J of the wheel K when the wheel is in position, as shown in Fig. 2. This support G may either be perfectly straight or formed upon a curve to correspond to the shape of the tire, and passing horizontally through the post A and the casting F is the adjustable screw L, which bears against the outer side of the tire and thus adjusts it accurately in position in relation to the support G. Swiveled upon the lower end of the screw I is a bearing-plate N, which rests upon the top of the felly of the wheel, so that when the screw I is turned so as to exert a downward pressure upon the plate N the felly will be forced downward inside of the tire J. The tire J, resting upon the support G, has no movement, except when the wheels revolve; but the bolts having been removed that secure the felly, together with the downward pressure of the screw I, displaces the felly downwardly. After the pressure has been applied at one part of the felly the screw is slightly reversed, so as to raise the plate N, the wheel is partially revolved, and then pressure is applied to the felly at another point.

In order to adjust the machine to wheels of different diameters and which have hubs of different lengths, a cone-shaped bearing M is used and which fits in the lower end of the hub, and owing to its conical shape the wheel is free to tilt and thus be adjusted into any desired position. In order to adjust the conical-shaped bearing M to wheels of different sizes, it has its lower ends placed in a slot O in the inner free end of the board P, which is hinged at its outer end to the post A in between the two ends of the sides B. This board P is hinged at its outer end, so that its inner one will have a rising-and-falling movement, and thus enable the conical support M to be adjusted to a wheel of any make.

Pivoted upon the cross-board C is a lever Q, which has its inner end to bear against the under side of the board P and its outer end curved to bear against the under side of the pivoted lever E. When the outer end of the lever is depressed, the inner end of the lever Q is raised, carrying the wheel placed upon the bearing with it, and when the free end of the lever E is released from its keeper R on the post A the board P sinks from its own weight.

It will be seen that the parts which constitute my machine are few, simple, readily operated, and are not liable to get out of repair. By the use of my invention skilled labor can be dispensed with in removing tires from wheels, as it can be readily operated by a boy.

Having thus described my invention, I claim—

The post, the sides which extend therefrom, the cross-piece which connects the sides, and the slotted board which forms a support for the cone, and which is hinged to the post at one end, combined with a cone upon which the wheel is placed, levers for raising the free end of the slotted board, a suitable support for the outer edge of the wheel secured to the post, and a screw for forcing the felly downward, substantially as shown.

In testimony whereof I affix my signature in presence of two witnesses.

AUGUST MILLER.

Witnesses:
CHARLES R. BUYACK,
HARRY PAGLE.